United States Patent [19]
Dannheim

[11] Patent Number: 5,514,782
[45] Date of Patent: May 7, 1996

[54] PHENYL-AZO-AMINOPHENYL COMPOUNDS SUBSTITUTED BY AN AMINOSUBSTITUTED FLUORO-TRIAZINYLAMINO GROUP AND A FIBRE-REACTIVE GROUP OF THE VINYLSULFONE SERIES

[75] Inventor: Jörg Dannheim, Frankfurt am Main, Germany

[73] Assignee: Hoechst Aktiengesellschaft, Germany

[21] Appl. No.: 41,699

[22] Filed: Apr. 1, 1993

[30] Foreign Application Priority Data

Apr. 1, 1992 [DE] Germany .............. 42 10 732.6

[51] Int. Cl.$^6$ .......................... C09B 62/08; C09B 62/16; C09B 62/24; C09B 62/32
[52] U.S. Cl. .................. 534/638; 8/662; 8/549; 534/635; 534/632
[58] Field of Search ............. 8/549, 662; 534/635, 534/632, 638

[56] References Cited

U.S. PATENT DOCUMENTS

| | | | |
|---|---|---|---|
| 4,545,785 | 10/1985 | Seiler | 8/549 |
| 4,649,193 | 3/1992 | Meininger et al. | 534/635 |
| 5,059,021 | 3/1987 | Stohr et al. | 534/635 |

FOREIGN PATENT DOCUMENTS

| | | |
|---|---|---|
| 0122881 | 10/1984 | European Pat. Off. . |
| 0356860 | 3/1990 | European Pat. Off. . |

OTHER PUBLICATIONS

"New Water Soluble Reactive Azo DyeStuff Cpd . . . " 87.07.23 C87≧086741, Schlafer L, Springer H, Kunze M. DE3601722.
"Isopropenyl–Sulphonyl–benzene mono: and dis:Azo Coumpounds for Use as a water Soluble Reactive Dyestuff"; C92–170136; EP513657A.

New Water Soluble Reactive Azo Dyestuff Cpds Used for Dyeing Material Contg. Carbonamido and/or Hydroxyl Gps., and Cellulose–Polyester Fibre; C87–086741; DE360/ 722. 87.01.14.

Primary Examiner—Paul Lieberman
Assistant Examiner—Necholas Ogden
Attorney, Agent, or Firm—Connolly & Hutz

[57] ABSTRACT

Water-soluble monoazo compounds of the formula

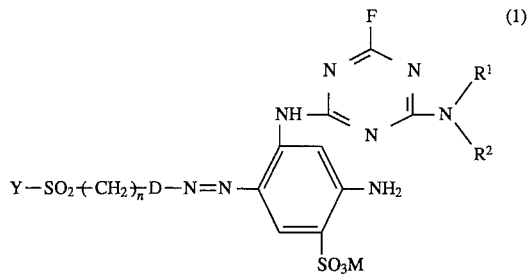

are described, suitable as fiber-reactive dyes for dyeing hydroxy- and/or carboxamido-containing material, in particular fiber material, such as wool and cellulose fiber materials, in which D is phenylene which can be substituted by 1 or 2 substituents customary in diazo components of fiber-reactive dyes and/or by a group of the formula $Y-SO_2-(CH_2)_m-$ where Y has one of the meanings given below and m is the number 1 or 2, or is naphthylene which can be substituted by 1 or 2 substituents customary in diazo components of fiber-reactive dyes, or is benzothiazol-2-yl containing the group aforementioned $Y-SO_2-(CH_2)_n-$ bonded to the carbocyclic ring thereof and can be substituted by a further substituent customary in fiber-reactive dyes, n is the number zero, 1 or 2, the group $Y-SO_2-$ is a fiber-reactive group from the vinylsulfonyl series, M is hydrogen or the mole equivalent of a metal, such as, in particular, an alkali metal, and the group $-NR^1R^2$ represents an amino group optionally substituted by lower alkyl and/or phenyl, which lower alkyl and phenyl may be substituted by substituents customary for fiber-reactive dyes.

11 Claims, No Drawings

PHENYL-AZO-AMINOPHENYL COMPOUNDS SUBSTITUTED BY AN AMINOSUBSTITUTED FLUORO-TRIAZINYLAMINO GROUP AND A FIBRE-REACTIVE GROUP OF THE VINYLSULFONE SERIES

DESCRIPTION

Water-soluble azo compounds, a process for their preparation and their use as dyes.

The invention is in the technical field of water-soluble azo dyes exhibiting fiber-reactive properties.

The present invention provides novel water-soluble azo compounds have been found which have the formula (1)

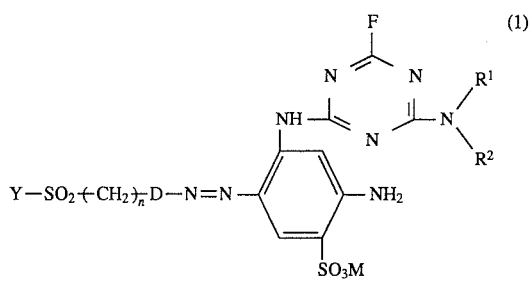

in which

Y is vinyl or is ethyl which contains a substituent in the β position which can be eliminated by an alkali with the formation of a vinyl group, or is β-hydroxyethyl;

n is the number zero, 1 or 2;

D is phenylene which can be substituted by 1 or 2 substituents from the group comprising alkyl of 1 to 4 carbon atoms, alkoxy of 1 to 4 carbon atoms, sulfo, chlorine, bromine, fluorine, carboxy, nitro, hydroxy, alkanoylamino of 2 to 5 carbon atoms, benzoylamino and benzolyamino which is substituted by substituents from the group comprising methyl, ethyl, methoxy, ethoxy, chlorine and sulfo, or by 1 or 2 of these substituents and a group of the formula Y—$SO_2$—$(CH_2)_m$— in which Y has one of the abovementioned meanings and m is the number 1 or 2, or by a group of the formula Y—$SO_2$—$(CH_2)_m$—, or D is naphthylene which can be substituted by 1 or 2 substituents from the group comprising alkyl of 1 to 4 carbon atoms, alkoxy of 1 to 4 carbon atoms, chlorine, bromine, fluorine, carboxy, sulfo, nitro, hydroxy, alkanoylamino of 2 to 5 carbon atoms, benzoylamino and benzoylamino which is substituted by substituents from the group comprising alkyl of 1 to 4 carbon atoms, alkoxy of 1 to 4 carbon atoms, chlorine and sulfo, preferably by sulfo, or D is benzothiazol-2-yl which contains the group mentioned of the formula Y—$SO_2$—$(CH_2)_n$— bound to the carbocyclic ring and can be substituted in this benzene ring by a further substituent from the group comprising alkyl of 1 to 4 carbon atoms, alkoxy of 1 to 4 carbon atoms, sulfo, nitro, chlorine, bromine, hydroxy, alkanoylamino of 2 to 5 carbon atoms, benzoylamino and benzoylamine which is substituted by substituents from the group comprising alkyl of 1 to 4 carbon atoms, alkoxy of 1 to 4 carbon atoms, chlorine and sulfo, preferably sulfo;

M is hydrogen or the mole equivalent of a metal, preferably of an alkali metal or alkaline earth metal, such as of calcium, and is particularly preferably sodium, potassium or lithium;

$R^1$ is hydrogen or alkyl of 1 to 4 carbon atoms, such as methyl or ethyl, or is phenyl, or is alkyl of 1 to 4 carbon atoms, preferably of 2 to 4 carbon atoms, which is substituted by 1 or 2 nonionic and/or anionic substituents, such as, for example, by substituents from the group comprising hydroxy, alkanoyloxy of 2 to 5 carbon atoms, sulfato, phosphato, phosphono, sulfo, carboxy , the phosphonic acid group, alkoxy of 1 to 4 carbon atoms, phenyl, sulfophenyl and cyano, preferably by substituents from the group comprising sulfo, carboxy, the phosphonic acid group, sulfato and phosphato;

$R^2$ is alkyl of 1 to 4 carbon atoms, such as methyl or ethyl, or is phenyl, or is alkyl of 1 to 4 carbon atoms, preferably of 2 to 4 carbon atoms, which is substituted by 1 or 2 nonionic and/or anionic substituents, such as, for example, by substituents from the group comprising hydroxy, alkanoyloxy of 2 to 5 carbon atoms, sulfato, phosphato, phosphono, sulfo, carboxy, the phosphonic acid group, alkoxy of 1 to 4 carbon atoms, phenyl, sulfophenyl and cyano, preferably by substituents from the group comprising sulfo, carbozy, the phosphonic acid group, sulfato and phosphato, or is phenyl which is substituted by 1, 2 or 3 substituents from the group comprising methyl, ethyl, methoxy, ethoxy, chlorine, cyano, nitro, sulfo, carboxy and carbamoyl, preferably by 1 or 2 substituents from the group comprising sulfo and carboxy , or is naphthyl which can be substituted, and is preferably substituted, by 1, 2 or 3 sulfo groups or 1 or 2 carboxy groups or by 1 or 2 sulfo groups and a carboxy group.

The formula radical D is preferably phenylene which is unsubstituted or substituted by 1 or 2 substituents from the group comprising methyl, ethyl, methoxy, ethoxy, chlorine and bromine, preferably by 1 or 2 substituents from the group comprising methyl, methoxy and ethoxy, or is preferably naphthylene, such as, in particular, 2,6-naphthylene and 2,8-naphthylene whose bond to the azo group is in the 2 position and which is unsubstituted or substituted by one or two, preferably one, sulfo group.

In formula (1), $R^1$ is preferably hydrogen or alkyl of 1 to 4 carbon atoms, such as methyl or ethyl, and particularly preferably hydrogen, and in formula (1) $R^2$ is preferably alkyl of 2 to 4 carbon atoms which is substituted by carboxy, sulfo or by the phosphonic acid group, or is a phenyl radical which is substituted by 1 or 2 substituents from the group comprising carboxy, sulfo and the phosphonic acid group and can be substituted by one or two further substituents from the group comprising methyl, ethyl, methoxyand ethoxy; particularly preferably, $R^2$ is further substituted by 1 or 2 sulfo.

Alkyl of 1 to 4 carbon atoms is preferably ethyl and in particular methyl, and alkoxy of 1 to 4 carbon atoms is preferably ethoxy and in particular methoxy; alkanoylamino of 2 to 5 carbon atoms is preferably propionylamino and acetylamino.

Examples of substituents which are in the β position of the ethyl radical of Y and can be eliminated by alkali are halogen atoms, such as bromine, fluorine and in particular chlorine, ester groups of organic carboxylic acids or sulfonic acids, for example alkanoyloxy of 2 to 5 carbon atoms, such as propionyloxy and in particular acetyloxy, or alkylsulfonyloxy of 1 to 4 carbon atoms, such as ethylsulfonyloxy, or acyloxyradicals of aromatic carboxylic or sulfonic acids, such as benzoyloxy, sulfobenzoyloxy, phenylsulfonyloxy or toluenesulfonyloxy, furthermore, for example, the monoester groups of phosphoric acid and in particular of sulfuric acid and of thiosulfuric acid, i.e. phosphato and in particular sulfato and thiosulfato, or this substituent in the β position is, for example, alkylsulfonylamino containing an alkyl radical of 1 to 4 carbon atoms or an arylsulfonylamino radical, such as, for example, a phenylsulfonylamino radical, or is phenoxy or dialkylamino containing alkyl groups each having 1 to 4 carbon atoms, such as dimethylamino and diethylamino. Y is preferably vinyl and in particular β-sulfatoethyl.

Sulfo groups are groups of the formula —$SO_3M$, carboxy groups are groups of the formula —COOM, sulfato groups are groups of the formula —$OSO_3M$, thiosulfato groups are groups of the formula —S—$SO_3M$, phosphato groups are groups of the formula —$OPO_3M_2$ and phosphono groups are groups of the formula —$OPO_2M_2$, in which M has one of the abovementioned meanings.

In accordance with the definition of M, the azo compounds according to the invention can be either present in the form of the free acid or in the form of their salts. They are preferably in the form of the salts, in particular of the alkali metal salts, such as sodium salts, potassium salts and lithium salts. The azo compounds according to the invention are preferably used in the form of the salts, preferably the alkali metal salts, for the dyeing and printing of hydroxy- or carboxamido-containing materials, in particular fiber materials.

Of the azo compounds according to the invention, particular mention may furthermore be made of those having the formula (1a)

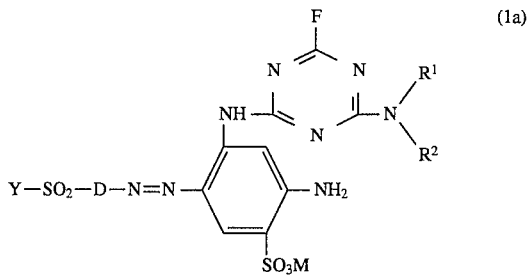

(1a)

in which $R^1$, $R^2$, M and Y have one of the abovementioned, in particular preferred, meanings, D is phenylene or phenylene which is substituted by 1 or 2 substituents from the group comprising methyl, ethyl, methoxy, ethoxy, chlorine and bromine, preferably methyl, methoxy and ethoxy, or is naphthylene, preferably 2,6- or 2,8-naphthylene, which can be substituted by a sulfo group. In formula (1a), $R^1$ is preferably hydrogen and $R^2$ is preferably monosulfo- or disulfophenyl. In the compounds of the formula (1), where n is zero, and in the compounds of the formula (1a), the radical D is preferably a p-phenylene radical.

The present invention furthermore relates to a process for the preparation of the azo compounds according to the invention of the formula (1), which comprises coupling the diazonium compound of an amino compound of the formula (2)

(2)

in which D, Y and n have one of the abovementioned meanings, to a compound of the formula (3)

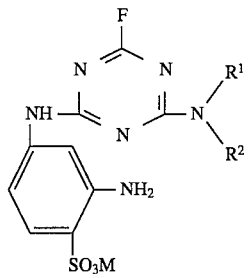

(3)

in which $R^1$, $R^2$ and M have one of the abovementioned meanings, and, if desired, converting the group Y—$SO_2$, in the case where Y is β-hydroxyethyl, in the usual manner into the azo compound of the formula (1) where Y is β-sulfatoethyl by means of a sulfating agent or into the azo compound of the formula (1) where Y is β-phosphatoethyl by means of a phosphating agent. Examples of sulfating agents are 90 to 100% sulfuric acid, chlorosulfonic acid, sulfamic acid or compounds releasing sulfur trioxide, such as sulfuric acid containing sulfur trioxide (oleum). Examples of phosphating agents are concentrated phosphoric acid, pyrophosphoric acid, metaphosphoric acid or polyphosphoric acid, furthermore alkyl polyphosphates, phosphorus oxychloride or mixtures of phosphoric acid and phosphorus(V) oxide.

The coupling reaction according to the invention is carried out analogously to known coupling procedures of diazonium salts onto aniline compounds, for example in neutral to strongly acidic, preferably aqueous, medium, preferably at a pH of between 1 and 7, preferably between 3.5 and 6.5, and at a temperature of between −5° C. and +25° C., preferably between 5° and 20° C. Buffer substances, such as sodium acetate and sodium dihydrogen phosphate, and compounds improving the rate of coupling, such as, for example, dimethylformamide and pyridine, can be added to the reaction batch for the preparation of the azo compounds according to the invention.

Conversion of the β-hydroxyethylsulfonyl group into a β-sulfato- or β-phosphatoethylsulfonyl group is carried out at a temperature of between 0° C. and +80° C., depending on the reactivity of the sulfating and phosphating agent. As a rule, sulfation is effected by means of 96 to 100% sulfuric acid or sulfuric acid containing up to 20% of sulfur trioxide at a temperature of between 0° and 25° C.

Examples of amino compounds of the formula (2) which serve as diazo components for the preparation of the azo compounds according to the invention are: 4-β-sulfatoethylsulfonylaniline, 4-β-chloroethylsulfonylaniline, 4-β-phosphatoethylsulfonylaniline, 4-vinylsulfonylaniline, 4-β-thiosulfatoethylsulfonylaniline, 2-bromo-4-β-sulfatoethylsulfonylaniline, 2-chloro- 4-β-sulfatoethylsulfonylaniline, 2-chloro-5-β-chloroethylsulfonylaniline, 3-β-sulfatoethylsulfonylaniline, 2-bromo-5-β-sulfatoethylsulfonylaniline, 2,6-dichloro- 4-β-sulfatoethylsulfonylaniline, 2,6-dibromo-4-β-sulfatoethylsulfonylaniline, 2,5-dichloro-4-β-sulfatoethylsulfonylaniline, 2-methyl-5-β-sulfatoethylsulfonylaniline, 2-methoxy-5-β-sulfatoethylsulfonylaniline, 2-methoxy-4-β-sulfatoethylsulfonylaniline, 2-methyl-6-chloro- 4-β-sulfatoethylsulfonylaniline, 2,6-dimethyl-4-β-sulfatoethylsulfonylaniline, 2,6-dimethyl-3-β-sulfatoethylsulfonylaniline, 2,5-dimethoxy-4-β-sulfatoethylsulfonylaniline, 2-methoxy-5-methyl-4-β-sulfatoethylsulfonylaniline, 2-nitro-4-β-sulfatoethylsulfonylaniline, 4-nitro-2-β-sulfatoethylsulfonylaniline, 6-β-sulfatoethylsulfonyl-2-naphthylamine, 1-sulfo- 6-β-sulfatoethylsulfonyl-2-naphthylamine, 8-β-sulfatoethylsulfonyl-2-naphthylamine, 6-sulfo-8-β- sulfatoethylsulfonyl-2-naphthylamine, 6-vinylsulfonyl-2-aminobenzothiazole, 6-β-sulfatoethylsulfonyl-2-aminobenzothiazole, 4-ω-(β-sulfatoethylsulfonyl)tolylamine, 6-methoxy- 3-ω-(β-sulfatoethylsulfonyl)tolylamine, 4-methoxy- 3-ω-β-sulfatoethylsulfonyl)tolylamine, 4-methyl- 3,5-bis(β-sulfatoethylsulfonylmethyl)aniline, 4-β-(β'-sulfatoethylsulfonyl)ethylaniline, 3-β-(β'-sulfatoethylsulfonyl)ethylaniline and 5-(β-sulfatoethylsulfatoethylsulfonyl)ethylaniline and the β-hydroxyethylsulfonyl, β-chloro-, β-acetoxy- and β-phosphatoethylsulfonyl and vinylsulfonyl derivatives of these compounds that have not already been mentioned.

The compounds of the formula (2) are known and have been described in the literature in large numbers. The compounds (1,3-diaminobenzene-6-sulfonic acid, cyanuric fluoride and amines of the formula $HNR^1R^2$ where $R^1$ and $R^2$ have the abovementioned meanings), which serve as starting compounds for the preparation of the coupling component of the formula (3) are also known.

The starting compounds of the formula (3) can be prepared analogously to the known procedures for the reaction of cyanuric fluoride (2,4,6-trifluoro-1,3,5-triazine) with amino compounds. This reaction can be carried out in aqueous medium or an aqueous-organic medium, the organic portion being a water-miscible organic solvent which is inert towards trifluorotriazine, such as, for example, acetone, dioxane and dimethylformamide. Thus, the compound of the formula (3) can be prepared by reaction of trifluorotriazine with an amine of the formula $HNR^1R^2$ of the abovementioned meaning at a temperature of between −5° C. and +5° C. and a pH of between 2 and 7, followed by reaction of the difluoroaminotriazine compound obtained with the 1,3-diaminobenzene-6-sulfonic acid at a temperature of between 0° and 10° C. and a pH of between 2 and 7. If the reaction is started with 1,3-diaminobenzene-6-sulfonic acid and this compound is reacted with cyanuric fluoride, a reaction temperature of between −5° C. and +10° C. and a pH of between 2 and 7 are selected; the subsequent reaction of the difluorotriazine compound with the amine $HNR^1R^2$ is then carried out at a temperature of between 0° and 10° C. and a pH of between 2 and 7. In order to adjust the pH and to buffer the acid released, the usual acid-binding agents, such as alkali metal carbonates and alkaline earth metal carbonates, sodium hydroxide, alkali metal bicarbonates and alkaline earth metal bicarbonates, sodium fluoride and alkali metal acetates are used, preferred alkali metals and alkaline earth metals being sodium, potassium and calcium.

Examples of starting compounds of the formula (3) are 3-[2'-fluoro-4'-(4''-sulfophenylamino)-s-triazin- 6'-ylamino]-6-sulfoaniline, 3-[2'-fluoro-4'-(3''-sulfophenylamino)-s-triazin-6'-ylamino]-6-sulfoaniline, 3-[2'-fluoro-4'-(β-sulfophenylamino)-s-triazin- 6'-ylamino]-6-sulfoaniline, 3-[2'-fluoro-4'-(β-sulfoethylamino)-s-triazin-6'-ylamino]-6-sulfoaniline, 3-[2'-fluoro-4'-(4''-carboxyphenylamino)-s-triazin- 6'-ylamino]-6-sulfoaniline, 3-[2'-fluoro-4'-(4''-carboxyphenylamino)-s-triazin-6'-ylamino]-6-sulfoaniline, 3-[2'-fluoro-4'-(2''-carboxyphenylamino)-s-triazin-6'-ylamino]-6-sulfoaniline, 3-[2'-fluoro-4'-(1''-sulfonaphth-2''-ylamino)-s-triazin-6'-ylamino]-6-sulfoaniline, 3-[2'-fluoro-4∝-(4''-carboxy-2''-methylphenylamino)-s-triazin-6'-ylamino]-6-sulfoaniline, 3-[2'-fluoro- 4'-(5''-sulfo-2''-chlorophenylamino)-s-triazin- 6'-ylamino]-6-sulfoaniline and 3-[2'-fluoro-4'-(3''-sulfo- 4''-chlorophenylamino)-s-triazin-6'-ylamino]-6-sulfoaniline.

Precipitation and isolation of the compounds according to the invention of the formula (1)—hereinafter designated as compounds (1)—from the aqueous synthesis solutions can take place by generally known methods for water-soluble compounds, for example, advantageously after bringing the synthesis solution to a pH of 3.5 to 7.0, by precipitation from the reaction medium by means of an electrolyte, such as sodium chloride or potassium chloride, or by evaporation or spray-drying of the synthesis solution. If the last-mentioned type of isolation is selected, it is in many cases recommended to remove, before evaporation, any amounts of sulfate which may be present in the solutions by precipitation as calcium sulfate and removal of the calcium sulfate by filtration.

Compounds (1) exhibit fiber-reactive properties and possess very valuable dye properties. Accordingly, they can be used for the dyeing (including printing) of hydroxy-containing and/or carboxamido-containing materials. To this end, compounds (1) can also be used for dyeing in the form of the solutions obtained after synthesis, if appropriate after addition of a buffer substance and, if appropriate, after concentrating, directly as liquid preparation.

Accordingly, the present invention also relates to the use of compounds (1) for the dyeing (including printing) of hydroxy- and/or carboxamido-containing materials and to processes for applying them to these substrates. The materials are preferably used in the form of fiber materials, in particular in the form of textile fibers, such as yarns, such as, for example, in the form of hanks and packages, and fabrics. This can be done analogously to known procedures.

Hydroxy-containing materials are those of natural or synthetic origin, such as, for example, cellulose fiber materials or the regenerated products thereof and polyvinyl alcohols. Cellulose fiber materials are preferably cotton but also other vegetable fibers, such as linen, hemp, jute and ramie fibers; examples of regenerated cellulose fibers are staple viscose and filament viscose.

Examples of carboxamido-containing materials are synthetic and natural polyamides and polyurethanes, in particular in the form of fibers, for example wool and other animal hair, silk, leather, nylon-6,6, nylon-6, nylon-11 and nylon-4.

In accordance with the use according to the invention, compounds (1) can be applied to the substrates mentioned, in particular to the fiber materials mentioned, and fixed thereon by the application techniques known for water-soluble, fiber-reactive dyestuffs, for example by applying compounds (1) in dissolved form to the substrate or incorporating them therein and fixing them thereon or therein by application of heat or by reaction of an alkaline agent or by both measures. Such dyeing and fixing methods have been described in the literature in large numbers (for example in European Published Patent Application No. 0,181,585 A2).

For example, compounds (1) produce dyeings on cellulose fibers by the exhaust method using a wide range of alkali additives from the long liquor in very good color yield. They dye cellulose fibers by the known padding processes, in which compound (1) can be fixed by means of alkali by batching at room temperature, by steaming or by means of drying, in color yields which are also excellent. In the printing processes, it is also possible to use the usual one-phase procedures in the presence of an acid-binding agent or an alkali-donating agent, such as, for example, sodiumbicarbonate, sodiumcarbonate or sodium trichloroacetate, in the printing pastes, followed by fixing by steaming, for example at 101° to 103° C., or the two-phase procedures using neutral or weakly acidic printing pastes, after the printing of which the fiber material is either led through a hot electrolyte-containing alkaline bath or else overpadded with an alkaline electrolyte-containing padding liquor and compound (1) is then fixed by steaming or drying.

This process gives prints of high color strength having crisp contours and a clear white ground. The quality of the prints is virtually not affected by varying fixation conditions, as a result of which they show satisfactory constancy of shade.

The dyeings or prints obtained with compounds (1) on cellulose fiber materials have remarkable fastness properties; of these, in particular the most important manufacturing and wearing properties may be mentioned, such as light fastness on moist and dry fiber material, wash fastness at 60° C. and 95° C., fastness to boiling with sodium carbonate, acid and alkaline milling fastness, water fastness, sea-water fastness, acid cross-dyeing fastness, alkaline and acid perspiration fastness, pleating, hot press and rub fastness and chlorinated water fastness and waste gas fastness. Copper salts do not change the shade of the dyeings and prints even in the presence of peroxide-containing detergents. Nor is the shade to be altered by a resin finish. Furthermore, compounds (1) do not show phototropy.

Not only the natural but also the synthetic polyamide fiber materials are dyed with compounds (1) preferably from an acid, aqueous dye bath or an acid, aqueous dye liquor. The desired pH of the dye bath or dye liquor is preferably adjusted using acetic acid or acetic acid and ammonium acetate or sodium acetate. In order to obtain good levelness of the dyeings or to improve their levelness, it is advantageous to use additionally customary leveling aids, for example compounds based on a reaction product of a fatty amine, such as, for example, stearylamine, with an alkylene oxide, such as ethylene oxide, or of a reaction product of cyanuric chloride with about 3 times the molar amount of an aminobenzenesulfonic acid and/or of an aminonaphthalenesulfonic acid, in the dye bath or in the dye liquor. Dyeings can usually be carried out at temperatures of 60° to 80° C., preferably by the exhaust method, or else by the cold pad-batch method.

The Examples which follow serve to illustrate the invention. Parts and percentages are by weight unless stated otherwise. Parts by weight relate to parts by volume as the kilogram relates to the liter. The compounds described in these Examples by way of the formulae are given in the form of the free acids; in general, they are prepared and isolated in the form of their alkali metal salts, such as lithium salts, sodium salts or potassium salts, and used for dyeing in the form of their salts. Likewise, the starting compounds and components mentioned in the Examples which follow, in particular the Table Examples, in the form of the free acid can be used in the synthesis as such or in the form of the salt, preferably the alkali metal salt.

The absorption maxima ($\lambda_{max}$) given for the compounds according to the invention in the visible region were determined using the alkali metal salts in aqueous solution. In the Table Examples, the $\lambda_{max}$ values are put in brackets next to the hue; the wavelength is given in nm.

EXAMPLE 1

8.6 parts of sodium fluoride are added to a solution of 17.4 parts of 3-sulfoaniline in 200 parts of water which is at 0° C. and has a pH of 7, 15 parts by volume of concentrated aqueous hydrochloric acid are then added while maintaining this temperature, and 13.6 parts by volume of trifluorotriazine are then steadily added over a period of about 2 minutes while maintaining a temperature of 0° to 5° C. Stirring of the batch is continued for about 5 minutes, and an aqueous solution of 19.3 parts of 1,3-diaminobenzene-4-sulfonic acid in 100 parts of water having a pH of 6 is then added; reaction is carried out with further stirring while maintaining a pH of 5.5 and a temperature of between 5° and 10° C.

A hydrochloric-acid, aqueous solution of the diazonium salt obtained in the usual manner from 26.6 parts of 4-(β-sulfatoethylsulfonyl)aniline is added to the solution of the coupling component thus obtained; the coupling reaction is carried out at a pH of between 3 and 6.5 and a temperature of between 10° and 15° C.

The azo compound according to the invention is isolated from the synthesis solution in the usual manner, for example by salting out with sodium chloride. Filtration and drying give a yellow, electrolyte-containing (sodium chloride containing) powder of the compound according to the invention of the formula (written in the form of the free acid)

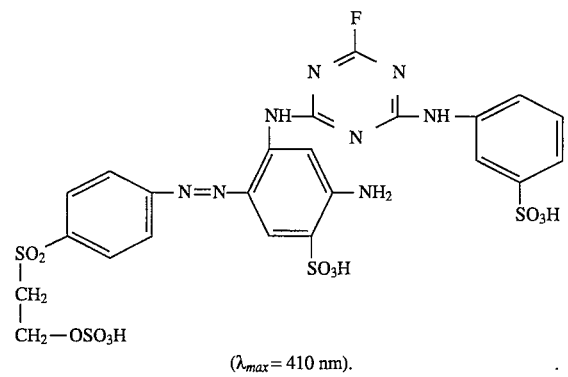

($\lambda_{max}$= 410 nm).

The monoazo compound according to the invention exhibits very good fiber-reactive dye properties and produces yellow dyeings of high color strength and good fastness properties, of which in particular the chlorine, light, perspiration light and wash fastness properties may be mentioned in particular, on the materials mentioned in the description, in particular cellulose fiber materials, by the application and fixation processes customary in the art for fiber-reactive dyes.

EXAMPLES 2 to 31

In the Table Examples which follow, further azo dyes according to the invention of the formula (A)

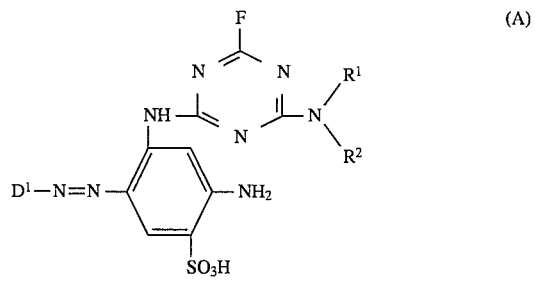

are described by means of their components. They can be prepared according to the manner of this invention, for example analogously to the above Example, using the components apparent from the particular Table Example in conjunction with the formula (A) (cyanuric fluoride, 1,3-diaminobenzene-6-sulfonic acid, the amine of the formula $HNR^1R^2$ and the diazonium salt of the amine of the formula $D^1$—$NH_2$). They exhibit very good fiber-reactive dye properties and dye the materials mentioned in the description, in particular cellulose fiber materials, such as cotton, in the hue given in the particular Table Example (here for cotton) in high color strength, the dyeings have good fastness properties.

| Ex. | Radical D¹ | Radical —NR¹R² | Hue |
|---|---|---|---|
| 2 | 4-(β-sulfatoethyl-sulfonyl)phenyl | 4-sulfophenylamino | yellow (409) |
| 3 | 4-(β-sulfatoethyl-sulfonyl)phenyl | 2-sulfophenylamino | yellow (412) |
| 4 | 4-(β-sulfatoethyl-sulfonyl)phenyl | 4-carboxyphenylamino | yellow (408) |
| 5 | 4-(β-sulfatoethyl-sulfonyl)phenyl | 3-carboxyphenylamino | yellow (410) |
| 6 | 4-(β-sulfatoethyl-sulfonyl)phenyl | 1-sulfonaphth-2-yl-amino | yellow (411) |
| 7 | 4-(β-sulfatoethyl-sulfonyl)phenyl | β-sulfoethylamino | yellow (412) |
| 8 | 4-(β-sulfatoethyl-sulfonyl)phenyl | N-methyl-N-(4-sulfo-phenyl)amino | yellow (410) |
| 9 | 4-(β-sulfatoethyl-sulfonyl)phenyl | N-methyl-N-(3-sulfo-phenyl)amino | yellow (408) |
| 10 | 4-vinylsulfonyl-phenyl | 4-sulfophenylamino | yellow (408) |
| 11 | 4-(β-phosphato-ethylsulfonyl)-phenyl | " | yellow (410) |
| 12 | 2-methoxy-5-(β-sulfatoethyl-sulfonyl)phenyl | " | yellow (419) |
| 13 | 2-methoxy-5-(β-sulfatoethyl-sulfonyl)phenyl | 3-sulfophenylamino | yellow (418) |
| 14 | 2-methoxy-5-(β-sulfatoethyl-sulfonyl)phenyl | N-methyl-N-(3-sulfo-phenyl)amino | yellow (420) |
| 15 | 2-bromo-4-(β-sulfatoethyl-sulfonyl)phenyl | 4-sulfophenylamino | yellow (430) |
| 16 | 2-bromo-4-(β-sulfatoethyl-sulfonyl)phenyl | 3-sulfophenylamino | yellow |
| 17 | 2,6-dichloro-4-(β-sulfatoethyl-sulfonyl)phenyl | β-sulfoethylamino | yellow |
| 18 | 3-(β-sulfatoethyl-sulfonyl)phenyl | 4-sulfophenylamino | yellow (406) |
| 19 | 3-(β-sulfatoethyl-sulfonyl)phenyl | 3-sulfophenylamino | yellow (405) |
| 20 | 3-(β-sulfatoethyl-sulfonyl)phenyl | N-methyl-N-(3-sulfo-phenyl)amino | yellow (407) |
| 21 | 3-(β-sulfatoethyl-sulfonyl)phenyl | 4-carboxyphenylamino | yellow (407) |
| 22 | 2-methoxy-5-methyl-4-(β-sulfatoethyl-sulfonyl)phenyl | " | yellow (419) |
| 23 | 2-methoxy-5-methyl-4-(β-sulfatoethyl-sulfonyl)phenyl | N-methyl-N-(4-carboxyphenyl)amino | yellow (418) |
| 24 | 2-methoxy-5-methyl-4-(β-sulfatoethyl-sulfonyl)phenyl | 4-carboxyphenylamino | yellow (419) |
| 25 | 2-carboxy-5-(β-sulfatoethyl-sulfonyl)phenyl | 4-sulfophenylamino | yellow (413) |
| 26 | 4-methoxy-5-(β-sulfatoethyl-sulfonyl)phenyl | " | yellow (417) |
| 27 | 4-methoxy-5-(β-sulfatoethyl-sulfonyl)phenyl | N-methyl-N-(4-sulfo-phenyl)amino | yellow (417) |
| 28 | 2,5-dimethoxy-4-(β-sulfatoethyl-sulfonyl)phenyl | 3-sulfophenylamino | yellow (420) |
| 29 | 2,5-dimethoxy-4-(β-sulfatoethyl-sulfonyl)phenyl | 4-sulfophenylamino | yellow (422) |
| 30 | 2-methoxy-5-chloro-4-(β-sulfatoethyl-sulfonyl)phenyl | " | yellow (416) |
| 31 | 2-methoxy-5-chloro-4-(β-sulfatoethyl-sulfonyl)phenyl | N-methyl-N-(4-sulfo-phenyl)amino | yellow (417) |
| | sulfonyl)phenyl | | |

What is claimed is:

1. A compound of the formula (1)

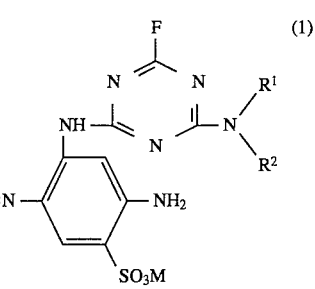

in which

Y is vinyl, or is ethyl which contains a substituent in the β position which is eliminated by an alkali with the formation of a vinyl group, or is β-hydroxyethyl;

n is the number zero, 1, or 2;

D is phenylene which is unsubstituted or is substituted by 1 or 2 of the following substituents: alkyl of 1 to 4 carbon atoms, alkoxy of 1 to 4 carbon atoms, sulfo, chlorine, bromine, fluorine, carboxy, nitro, hydroxy, alkanoylamino of 2 to 5 carbon atoms, benzoylamino or benzoylamino which is substituted by a substituent selected from the group consisting of methyl, ethyl, methoxy, ethoxy, chlorine and sulfo, or by 1 or 2 of these substituents and a group of the formula $Y—SO_2—(CH_2)_m—$ in which Y is as defined previously and m is the number 1 or 2, or by a group of the formula $$Y—SO_2—(CH_2)_m—,$$

M is hydrogen or the mole equivalent of a metal;

$R^1$ is hydrogen or alkyl of 1 to 4 carbon atoms, or is phenyl, or is alkyl of 1 to 4 carbon atoms which is substituted by 1 or 2 substituents selected from the group consisting of hydroxy, alkanoyloxy of 2 to 5 carbon atoms, sulfato, phosphato, phosphono, sulfo, carboxy, the phosphonic acid group, alkoxy of 1 to 4 carbon atoms, phenyl, sulfophenyl and cyano;

$R^2$ is alkyl of 1 to 4 carbon atoms, or is phenyl, or is alkyl of 1 to 4 carbon atoms which is substituted by 1 or 2 substituents selected from the group consisting of hydroxy, alkanoyloxy of 2 to 5 carbon atoms, sulfato, phosphato, phosphono, sulfo, carboxy, the phosphonic acid group, alkoxy of 1 to 4 carbon atoms, phenyl, sulfophenyl and cyano, or is phenyl which is substituted by 1,2 or 3 substituents selected from the group consisting of methyl, ethyl, methoxy, ethoxy, chlorine, cyano, nitro, sulfo, carboxy and carbamoyl, or is naphthyl or naphthyl which is substituted by 1, 2 or 3 sulfo groups or 1 or 2 carboxy groups or by 1 or 2 sulfo groups and a carboxy group.

2. A compound as claimed in claim 1, wherein D is phenylene which is unsubstituted or substituted by 1 or 2 of the following substituents: alkyl of 1 to 4 carbon atoms, alkoxy of 1 to 4 carbon atoms, chlorine or bromine.

3. A compound as claimed in claim 1, wherein $R^1$ is hydrogen and $R^2$ is alkyl of 1 to 4 carbon atoms or alkyl of 2 to 4 carbon atoms which is substituted by carboxy or sulfo, or is phenyl which is unsubstituted or is substituted by carboxy or sulfo.

4. A compound as claimed in claim 1, wherein $R^1$ is hydrogen and $R^2$ is alkyl of 2 to 4 carbon atoms which is substituted by sulfo, or is sulfo-substituted phenyl.

5. A compound as claimed in claim 1, wherein n is the number zero.

6. A compound as claimed in claim 1 of the formula (1a)

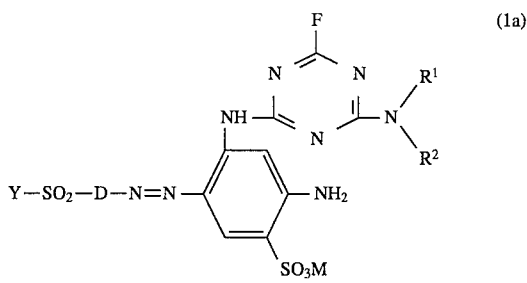

in which $R^1$, $R^2$, M and Y are as defined in claim 14 and D is unsubstituted phenylene or phenylene which is substituted by 1 or 2 of the following substituents: methyl, ethyl, methoxy, ethoxy, chlorine or bromine, or is naphthylene which is unsubstituted or substituted by a sulfo group.

7. A compound as claimed in claim 6, wherein D is phenylene which is unsubstituted or is substituted by one or two of the following substituents: methyl, methoxy or ethoxy.

8. A compound as claimed in claim 6, wherein D is phenylene.

9. A compound as claimed in claim 6, wherein $R^1$ is hydrogen and $R^2$ is monosulfophenyl or disulfophenyl.

10. A compound as claimed in claim 1, wherein M is the mole equivalent of an alkali metal or alkaline earth metal.

11. A compound as claimed in claim 1, wherein $R^2$ is phenyl which is substituted by 1 or 2 sulfo or carboxy substituents.

* * * * *

UNITED STATES PATENT AND TRADEMARK OFFICE
CERTIFICATE OF CORRECTION

PATENT NO. : 5,514,782
DATED : May 7, 1996
INVENTOR(S) : Dannheim

It is certified that error appears in the above-identified patent and that said Letters Patent is hereby corrected as shown below:

In column 10, line 38, the formula should read:

-- $Y-SO_2-(CH_2)_m-$, --.

In column 12, line 1, "claim 14" should read --claim 1--.

Signed and Sealed this

First Day of April, 1997

BRUCE LEHMAN

*Attest:*

*Attesting Officer*   Commissioner of Patents and Trademarks